United States Patent Office 2,842,546
Patented July 8, 1958

2,842,546
QUATERNARY AMMONIUM COMPOUNDS

Earl W. Lane, Philadelphia, Pa., assignor to Rohm & Haas Company, Philadelphia, Pa., a corporation of Delaware No Drawing. Application January 18, 1956
Serial No. 559,765

15 Claims. (Cl. 260—247)

This invention relates to N-polyalkylphenylpentenyl-N-dodecenyl-N,N-dialkylammonium halides as new compositions of matter. It also deals with a method for the preparation of these compounds.

The compounds of this invention may be represented by the formula

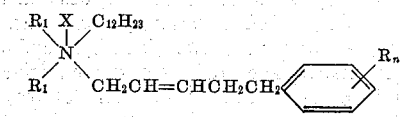

in which X is preferably a halogen having an atomic weight of about 35.5 and 127, R is an alkyl group of no more than two carbon atoms, $n$ is an integer of two to three, and the $R_1$ groups, taken individually, represent alkyl groups of no more than two carbon atoms and, taken collectively, represent a divalent saturated aliphatic chain of four to five atoms which jointly with the amino nitrogen forms a five- to six-sided heterocyclic monoamine. Divalent in the above sense is to be construed to mean $\alpha,\omega$ divalency, that is, one valence at each end of the chain.

The symbol X is preferably chlorine, bromine, or iodine. Chlorine is the preferred representation of X. It will be apparent to one skilled in the art that other anions may be satisfactorily employed such as sulfate, methyl sulfate, phosphate, acetate, citrate, tartrate, and the like, which may be supplied directly or by metathesis with the halide form of the present compounds or by the use of an anion-exchange resin. Generally, an anion having a group weight of up to about 127 is desired.

The $R_1$ groups, taken singly, may represent alkyl groups of no more than two carbon atoms, that is, methyl or ethyl groups, in which case the $R_1$ groups may be the same or different. The R groups, taken collectively and in conjunction with the amino nitrogen, may stand for a morpholino, thiamorpholino, pyrrolidinyl, or piperidino group, and these groups having a lower alkyl substituent, such as a methyl or ethyl group.

The symbol R represents a methyl or ethyl group and, since $n$ represents the integer 2 or 3, there may be two or three R groups on the benzene ring of the present compounds. The R groups may be located at any positions on the benzene ring, the exact positions being not critical. It is entirely satisfactory to employ commercially available mixtures in which compounds are present having the R groups at different positions on the benzene ring.

The dodecenyl group may be a straight or branched chain in any of the known spatial configurations, including n-dodecenyl, isododecenyl, 1,10-dimethyl-2-decenyl, 2,7-dimethyl-1-decenyl, 1-ethyl-2-methyl-5-nonenyl, 4-propyl-2-nonenyl, 5-butyl-2-octenyl, 1,2-diethyl-4-octenyl, 1-propyl-6-ethyl-3-heptenyl, and the like. The double bond may be at any possible location. A common commercial form of the dodecenyl group that yields a compound of this invention that is particularly effective for the present purposes is tetramethyloctenyl, in which there are two methyl groups on each of the number five and seven carbon atoms, and the double bond is at the number two location.

The present quaternary ammonium compounds may be prepared preferably in one of two equally satisfactory ways. In one case, a polyalkylphenylpentenyl halide is reacted with a dodecenyldialkylamine. Alternatively, the instant compounds may be prepared by reacting a polyalkylphenylpentenyldialkylamine with a dodecenyl halide. These reactants, set forth above and hereinafter, used for the preparation of the quaternary ammonium compounds of this invention are known or prepared by known methods. Illustrative methods for preparing typical reactants that may be used to prepare the compounds of this invention are shown in the following preparations in which parts by weight are used throughout.

PREPARATION A

A mixture of 16 parts of zinc chloride, 21.8 parts of butadiene, and 60 parts of t-octyl chloride is charged to a water cooled autoclave and agitated at 30° C. for 72 hours. The reaction mixture is washed with water, aqueous 10% sodium carbonate, and once again with water. The product may be purified by distillation under reduced pressure to yield a product that corresponds to t-dodecenyl chloride. This method is suitable for compounds having a tertiary carbon atom attached directly to a halide bearing carbon atom. The corresponding compounds containing a primary or secondary carbon atom attached to the halide bearing carbon atom may be readily prepared such as by reacting a selected alcohol with concentrated hydrochloric acid by known methods.

PREPARATION B

There are added to a reaction vessel 40.5 parts of n-dodecenyl chloride, 300 parts of aqueous 25% dimethylamine, and 8 parts of sodium hydroxide. The reaction mixture is heated for five hours at 72° to 88° C. The mixture is allowed to cool and then 150 parts of toluene is added. The toluene layer is separated, washed with water, and distilled under reduced pressure. The distillate is collected and identified as n-dodecenyldimethylamine.

There are employed in a like and satisfactory manner the other isomeric form of dodecenyl chloride such as 1-chloro-3-methyl-2-undecene, 1-chloro-3,4-dimethyl-2-decene, 2-chloro-3,3,4-trimethyl-6-nonene, and 1-chloro-5,5,7,7-tetramethyl-2-octene.

PREPARATION C

There are added to a reaction vessel 120 parts of trimethylbenzyl chloride, 35 parts of anhydrous zinc bromide, and 72 parts of chloroform. The temperature of the reaction mixture is maintained at 9° to 20° C. while 44 parts of butadiene is stirred for two and a half hours after the butadiene addition and then washed with water, aqueous 10% sodium carbonate, and water again. The mixture is dried over anhydrous magnesium sulfate, filtered, and distilled. The product distills at 170° to 200° C. at 23 mm. pressure and is identified as trimethylphenylpentenyl chloride. There are also employed as reactants as above and with similar results triethylbenzyl chloride, triethylbenzyl bromide, dimethylbenzyl iodide, and diethylbenzyl chloride.

PREPARATION D

Into a reaction vessel there are introduced 64 parts of trimethylphenylpentenyl chloride, 100 parts of aqueous 25% dimethylamine, and 12 parts of sodium hydroxide. The reaction mixture is heated for four hours at 60° C. The organic layer is taken up in benzene. To the benzene is added aqueous 10% hydrochloric acid. The aqueous layer is separated from the benzene layer and then aqueous NaOH is added thereto until basic. The amine product after drying over solid sodium hydroxide is distilled at 170° to 190° C. at 23 mm. pressure. The product corresponds to dimethylaminopentenyltrimethylbenzene. In a similar way and with similar results there are employed as reactants trimethylphenylpentenyl bromide and diethylamine, diethylphenylpentenyl chloride and dimethylamine, dimethylphenylpentenyl iodide and morpholine, triethylphenylpentenyl chloride and pyrrolidine, and trimethylphenylpentenyl chloride and piperidine.

Typical of the reactants that may be employed in the present instance, when a polyalkylphenylpentenyl halide is reacted with a dodecenyldialkylamine, include compounds chloropentenyltrimethylbenzene, chloropentenyldiethylbenzene, bromopentenyldimethylbenzene, iodopentenylmethylethylbenzene, bromopentenyltriethylbenzene, iodopentenyldimethylbenzene, dodecenyldimethylamine, dodecenyldiethylamine, dodecenylmethylethylamine, dodecenylmorpholine, dodecenylthiamorpholine, dodecenylpyrrolidine, and dodecenylpiperidine. When a polyalkylphenylpentenyldialkylamine is reacted with a dodecenyl halide there may be employed, typically, as reactants compounds dimethylaminopentenyltrimethylbenzene, diethylaminopentenyldimethylbenzene, morpholinopentenyltriethylbenzene, pyrrolidinylpentenylmethylbenzene, piperidinopentenyldiethylbenzene, ethylmethylaminopentenyltrimethylbenzene, diethylaminopentenyltrimethylbenzene, dodecenylchloride, dodecenyl bromide, and dodecenyl iodide.

The present quaternary ammonium compounds may be prepared by either of two equally satisfactory methods, as stated heretofore. The choice of either method is purely a matter of convenience. Both methods are conducted under essentially the same conditions. The reactants unite on a substantially equimolecular basis to produce substantially quantitative results.

The present reaction is consummated by bringing the reactants together at a reacting temperature, usually in the range of about 50° to 150° C., with the range of about 60° to 125° C. being preferred. It is often advantageous to use the reflux temperature of the reaction mixture when solvents are used. Reflux temperatures of up to about 225° C. and above are practical. The reactants may be supplied to the reaction mixture in equivalent amounts or either reactant may be slightly or greatly in excess, as desired. An inert volatile solvent may be advantageously employed, if desired. Suitable in this respect are water, acetonitrile, nitromethane, dimethylformamide, toluene, benzene, xylene, isopropanol, butanol, isopropyl ether, and the like, and mixtures thereof.

Reaction times of about two to twenty-four hours are generally employed depending largely on the reaction temperature, solvent, and individual reactants used. The time of reaction is not critical but merely influences the yield. As will be apparent to one skilled in the art, the longer reaction times generally favor higher yields, up to a point, and, of course, some reactants combine more speedily than others. In order to assure completeness of reaction and concomitant substantially quantitative results, if desired, there may be determined the amount of ionizable halide formed in the reaction mixture. When the theoretical amount of ionizable halide is present, the reaction is complete. At the conclusion of the reaction any solvent used is removed preferably by distillation, preferably under reduced pressure. The product is preferably washed with hexane, heptane, or the like, to remove any unused starting material and then isolated by removing volatile components, preferably under reduced pressure or on a steam bath. Recrystallization of the product may be accomplished, if desired, from a suitable solvent, such as ethyl acetate.

It is possible, and frequently advantageous, in the preparation of some of the instant compounds to first prepare the halide form, such as chloride, in a manner already set forth, and then prepare any other desired form within the present definition by metathesis or ion-exchange methods. For instance, any of the present compounds in halide form may be converted to the hydroxide form through the use of silver oxide, or the like, and then converted to any desired anion form by acidifying with an acid of choice such as sulfuric, phosphoric, acetic, and others within the range and spirit of this invention. As an alternative, an anion-exchange resin may be employed. Any of the present compounds, in halide or hydroxide form, may be converted to any desired anion form through the use of an anion-exchange resin in the desired anion form. For instance, there may be used an insoluble, cross-linked, styrene-divinylbenzene copolymeric quaternary ammonium salt in its sulfate, phosphate, or the like, form to convert a present compound in halide or hydroxide form to a desired form, such as sulfate, phosphate, and the like.

The quaternary ammonium compounds of this invention are generally white to gray waxy or solid materials that are especially valuable as bactericides particularly when applied against *Micrococcus pyogenes* var. *aureus* and *Salmonella typhosa* as determined by standard phenol coefficient tests. The present compounds give values in the range of about 350 to 485 and above against *Salmonella typhosa* and 1200 to 1500 and above against *Micrococcus pyogenes* var. *aureus*. For instance, N-trimethylpentenyl-N-dodecenyl-N,N-dimethylammonium chloride gave a value of 390 against *Salmonella typhosa* and over 1500 against *Micrococcus pyogenes* var. *aureus*. Similar results are obtained with the other compounds of this invention. The present compounds, also, exhibit strong bactericidal and bacteriostatic activity toward *B. suis*, *S. fecalis*, *N. catarrhalis*, among others, in a wide range of dilutions.

The compounds of this invention are useful fungicides in dilutions down to ½ ounce in 100 gallons of water and lower, particularly against *Stemphylium saracinaeforme* and *Monilinia fructicola*. These compounds exhibit valuable surface-active and cation-active wetting and emulsifying properties.

The compounds of this invention are valuable as detergent-sanitizers and may be employed in meat plants to sanitize cutting tables, grinders, and the like, in fruit processing operations, for instance, to wash and sanitize lemons, oranges, and grapefruit, and in dairy farms to sanitize dairy equipment and utensils.

A suitable detergent-sanitizer formulation for use in meat plants includes, by weight, 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. For sanitizing citrus fruit there is preferably used one part of a present compound in 5000 parts of water. For use in dairy farms, there may be used 10% of a quaternary ammonium compound of this invention, 10% of octylphenoxypolyethoxyethanol, 7% of trisodium phosphate, and 73% of water. One ounce of this solution is used per four gallons of water. The instant compounds in aqueous solutions in amounts of about 0.5 to one ounce to one hundred pounds of dry fabric, are excellent as a final diaper rinse to prevent diaper rash. These compounds are also excellent premise sanitizers where they may be employed in concentrations of about 0.1 to 2.0% in aqueous cleaning solutions.

The quaternary ammonium compounds of this invention and the method for their preparation may be more fully understood from the following examples which are presented by way of illustration and not by way of limitation. Parts by weight are used throughout.

Example 1

There are added to a reaction vessel 21 parts of trimethylphenylpentenyl chloride, 15.6 parts of dodecenyldimethylamine, and 50 parts of 2B benzene denatured ethanol. The mixture is heated at 70° to 78° C. for twenty-one hours and then cooled. There are added 45 parts of water and the resulting mixture is washed with three portions of 25 parts each of heptane. The volatile components are removed by evaporation at reduced pressure leaving the product. The product contains 2.9% nitrogen, 7.4% chlorine, has a chlorine to nitrogen ratio of 2.5 (2.5 theoretical), and is identified as N-trimethylphenylpentenyl - N - dodecenyl-N,N-dimethylammonium chloride.

The same compound is obtained by similarly reacting dodecenyl chloride with trimethylphenylpentenyldimethylamine.

Example 2

A mixture of 32 parts of bromopentenyldimethylbenzene, 26.5 parts of dodecenylpiperidine, and 150 parts of acetonitrile is heated at reflux for sixteen hours. The acetonitrile is removed by distillation under reduced pressure. The product is washed with heptane and dried. The product corresponds to the formula

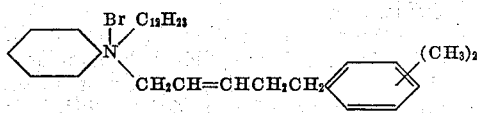

In a similar way, from dodecenylmorpholine and iodopentenylmethylethylbenzene, there is made the compound corresponding to the formula

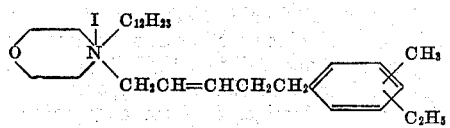

Example 3

There are added to a reaction vessel 30.1 parts of diethylaminopentenyltriethylbenzene, 20.2 parts of dodecenyl chloride, and 80 parts of nitromethane. The mixture is heated at 80° to 88° C. for twelve hours and then cooled. There are added 60 parts of water and the resulting mixture is washed with heptane. The volatile components are removed by distillation under reduced pressure leaving the product which corresponds to N-triethylphenylpentenyl - N - dodecenyl-N,N-dimethylammonium chloride.

In an analogous way, N-trimethylphenylpentenyl-N-dodecenyl-N-methyl-N-ethylammonium bromide is made from dodecenyl bromide and trimethylphenylpentenylmethylethylamine. The same result is obtained by reacting dodecenylmethylethylamine with trimethylphenylpentenyl chloride.

Example 4

A mixture of 23.7 parts of dodecenylpyrrolidine, 32 parts of chloropentenyldiethylbenzene, and 75 parts of ethanol is heated at reflux for ten hours and then cooled. The mixture is washed with heptane. The volatile components are removed by distillation under reduced pressure leaving the product which corresponds to the formula

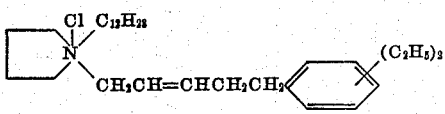

Correspondingly, there is made N-dimethylphenylpentenyl - N - dodecenyl-N,N-dimethylammonium bromide from dodecenyl bromide and dimethylphenylpentenyldimethylamine.

Example 5

There is prepared N-trimethylphenylpentenyl-N-dodecenyl-N,N-dimethylammonium phosphate by passing the corresponding halide form of the quaternary ammonium compound through a bed of chloromethylated and aminated styrene-divinylbenzene anion-exchange resin in free base form and then titrating with phosphoric acid. The same compound is prepared by first converting the anion-exchange resin to the phosphate form and then passing the chloride form of the quaternary ammonium compound through a bed of the anion-exchange resin in phosphate form. The compound N-diethylphenylpentenyl-N-dodecenyl-N,N-diethylammonium sulfate is prepared in a similar way.

I claim:

1. As a new composition of matter, the quaternary ammonium compound having the formula

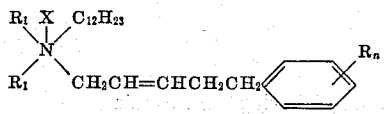

in which R is an alkyl group of no more than two carbon atoms, n is an integer of two to three, the $R_1$ groups taken singly represent alkyl groups of no more than two carbon atoms and taken collectively form a heterocyclic group from the class consisting of morpholino, thiamorpholino, piperidino, pyrrolidinyl and these groups having a lower alkyl substituent with the amino nitrogen atom and X is an anion.

2. As a new composition of matter, the quaternary ammonium compound having the formula

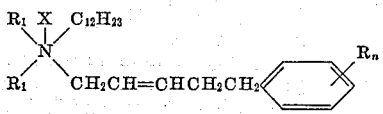

in which R is an alkyl group of no more than two carbon atoms, n is an integer of two to three, $R_1$ is an alkyl group of no more than two carbon atoms, and X is a halogen having an atomic weight of about 35.5 to 127.

3. As a new composition of matter, N-trimethylphenylpentenyl-N-dodecenyl-N,N-dimethylammonium chloride.

4. As a new composition of matter, N-methylethylphenylpentenyl-N-dodecenylmorpholinium iodide.

5. As a new composition of matter, N-diethylphenylpentenyl-N-dodecenylpyrrolidinium chloride.

6. As a new composition of matter, N-trimethylphenylpentenyl - N - dodecenyl - N - methyl-N-ethylammonium bromide.

7. As a new composition of matter, N-diethylphenylpentenyl-N-dodecenyl-N,N-diethylammonium sulfate.

8. The method for the preparation of a quaternary ammonium compound having the formula

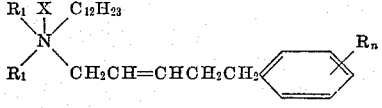

in which R is an alkyl group of no more than two carbon atoms, n is an integer of two to three, the $R_1$ groups taken singly represent alkyl groups of no more than two carbon atoms and taken collectively form a heterocyclic group from the class consisting of morpholino, thiamorpholino, piperidino, pyrrolidinyl and these groups having a lower alkyl substituent with the amino nitrogen atom and X is an anion which comprises bringing together at a reacting temperature in the range of about 50° C. to the reflux temperature in the presence of an inert volatile solvent a compound having the formula

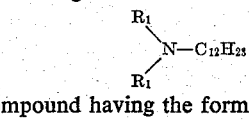

with a compound having the formula

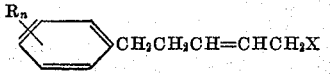

9. The method for the preparation of a quaternary ammonium compound having the formula

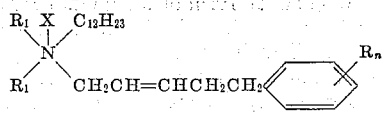

in which R is an alkyl group of no more than two carbon atoms, $n$ is an integer of two to three, $R_1$ is an alkyl group of no more than two carbon atoms, and X is a halogen having an atomic weight of about 35.5 to 127 which comprises bringing together at a reacting temperature in the range of about 50° C. to the reflux temperature in the presence of an inert volatile solvent a compound having the formula

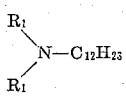

with a compound having the formula

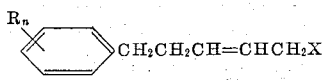

10. The method for the preparation of a quaternary ammonium compound having the formula

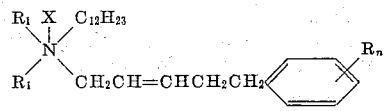

in which R is an alkyl group of no more than two carbon atoms, $n$ is an integer of two to three, $R_1$ is an alkyl group of no more than two carbon atoms, and X is an anion, which comprises bringing together at a reacting temperature in the range of about 50° C. to the reflux temperature in the presence of an inert volatile solvent a compound having the formula

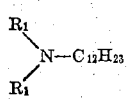

with a compound having the formula

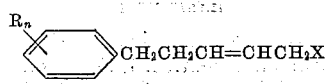

to form quaternary ammonium compound in halide form and then passing said compound through an anion-exchange resin free of halide ion to exchange the halide ion for a non-halide ion.

11. A method for the preparation of N-trimethylphenylpentenyl-N-dodecenyl-N,N-dimethylammonium chloride, which comprises bringing together at a reacting temperature in the range of about 60° to 125° C. in the presence of an inert volatile solvent trimethylphenylpentenyl chloride and dodecenyldimethylamine.

12. A method for the preparation of N-methylethylphenylpentenyl-N-dodecenylmorpholinium iodide, which comprises bringing together at a reacting temperature in the range of about 60° to 125° C. in the presence of an inert volatile solvent methylethylphenylpentenyl iodide and dodecenylmorpholine.

13. A method for the preparation of N-diethylphenylpentenyl-N-dodecenylpyrrolidinium chloride, which comprises bringing together at a reacting temperature in the range of about 60° to 125° C. in the presence of an inert volatile solvent diethylphenylpentenyl chloride and dodecenylpyrrolidine.

14. A method for the preparation of N-trimethylphenylpentenyl - N-dodecenyl-N-methyl-N-ethylammonium bromide, which comprises bringing together at a reacting temperature in the range of about 60° to 125° C. in the presence of an inert volatile solvent trimethylphenylpentenyl bromide and dodecenylmethylethylamine.

15. A method for the preparation of N-diethylphenylpentenyl - N - dodecenyl - N,N-diethylammonium sulfate, which comprises bringing together at a reacting temperature in the range of about 60° to 125° C. in the presence of an inert volatile solvent diethylphenylpentenyl chloride and dodecenyldiethylamine, to form a quaternary ammonium compound in halide form and then passing said compound through an anion-exchange resin free of halide ion to exchange the halide ion for a non-halide ion.

No references cited.